United States Patent Office 3,375,487
Patented Mar. 26, 1968

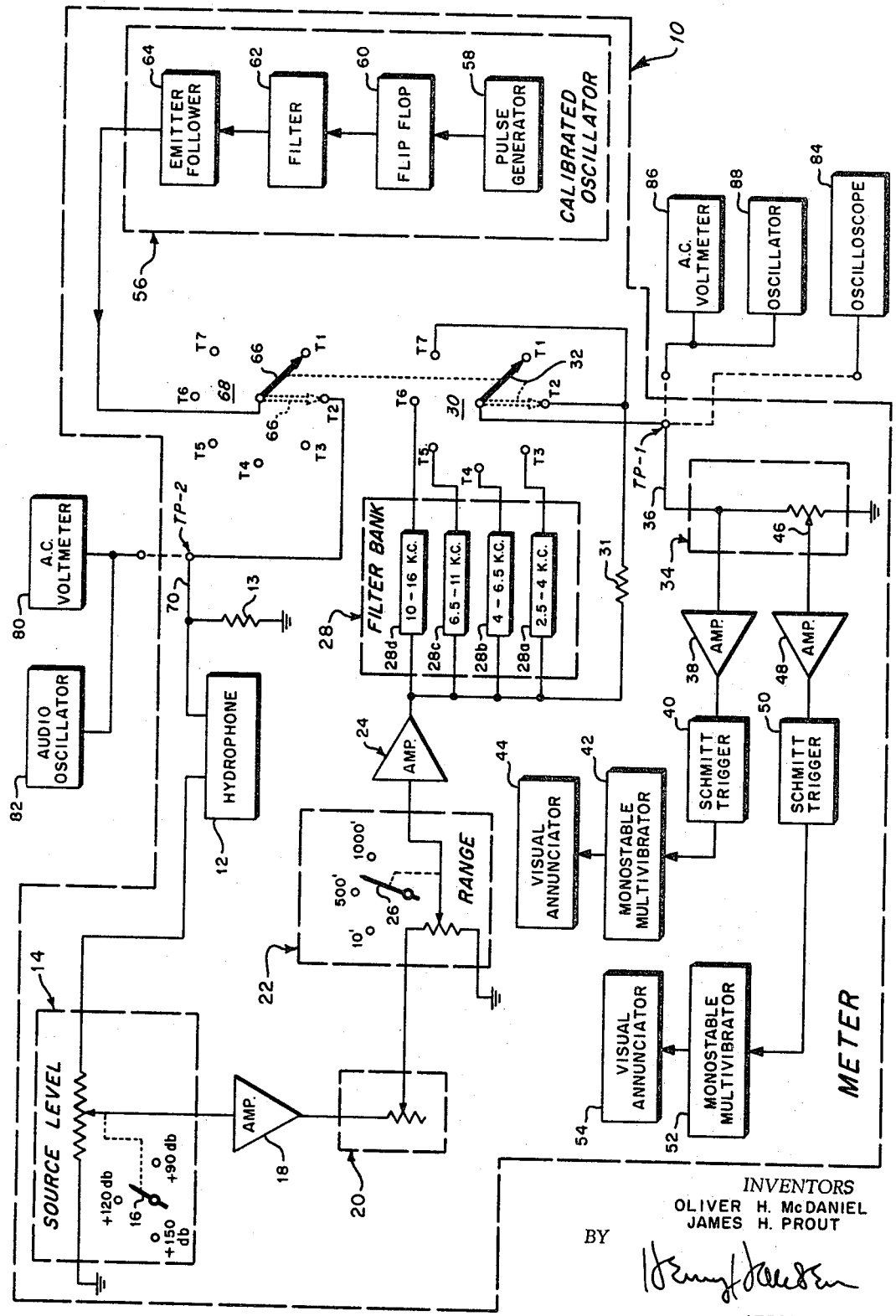

3,375,487
RADIATED POWER LEVEL METER
Oliver H. McDaniel and James H. Prout, State College, Pa., assignors, by mesne assignments, to the United States of America as represented by the Secretary of the Navy
Filed June 24, 1966, Ser. No. 560,931
17 Claims. (Cl. 340—5)

ABSTRACT OF THE DISCLOSURE

A meter for measuring the radiated power level at the source of energy radiated by a remotely located sonar transducer including a hydrophone, a pair of threshold circuits having respective precalibrated threshold levels for driving respective indicators in response to an input signal, a range potentiometer for attenuating the hydrophone output signal in accordance with the spacing of the hydrophone from the transducer, and a source level potentiometer having an associated dial calibrated in units of radiated power level which is adjusted until the hydrophone output signal level is additionally attenuated a sufficient degree so that the level of the input signal applied to the threshold circuits lies intermediate the precalibrated threshold levels.

---

The present invention relates generally to radiated signal measuring devices and more particularly to devices for remotely sensing and measuring the source power level of sound generation radiated in water by a sonar transducer.

In connection with the proper maintenance of the modern sonar now used on ships it is necessary to periodically measure the source level of the acoustical projectors or transducers of the ship's sonar in order to detect transducer and sonar dome faults. The known methods for measuring underwater accoustical source power levels while very accurate are quite cumbersome and time-consuming and entail the use of skilled personnel and complex equipment such as a calibrated oscilloscope.

It is known that considerable distortion of a transducer's radiated power level occurs in the immediate vicinity thereof and that this distortion may be avoided by measuring the power level at a location remote from that of the transducer. Since the transducer power level sensed and measured at a remote location is somewhat less than the radiated power level, an operator using the known methods of measuring radiated power must manually correct in some way the power measurements indicated by a calculated correction factor which is a function of the measured spacing between the transducer location and the location of the sensing device or hydrophone. A need has therefore arisen for a portable, easy to use, direct reading source power level meter.

The general purpose of this invention is to provide a sensing and indicating device which may be quickly set up and used by unskilled personnel to obtain a measurement of the radiated power level of the transducer of a ship's sonar. To attain this the present invention contemplates a novel self-calibrating source level meter having a unique, simplified display and including unique measuring and indicating circuits which may be utilized to obtain from a remote sensing location a direct reading of the source or radiated power level of a transducer.

An object of the invention is the provision of a portable source level meter which gives a direct reading of the radiated power level of a transducer as sensed and measured from a remotely located measuring point.

Another object of the present invention is the provision of a more simplified source level meter which may be operated by unskilled personnel.

Yet another object is to provide a meter for sensing underwater and measuring the acoustical energy projected by a transducer of a ship's sonar.

A further object is to provide a source level meter which includes built-in circuitry to enable unskilled personnel to quickly ascertain whether or not the meter is operating properly.

Still another object is to provide a portable, self-calibrating meter which provides ascertainable measurement indications from acoustical pulses of short duration.

Other objects and advantages of the invention will hereinafter become more fully apparent from the following description of the annexed drawing which illustrates a preferred embodiment.

In the drawing, the one figure is a block diagram and schematic of a direct reading sonar source level meter according to the invention.

Referring now to the drawing, the embodiment of a sonar source level meter 10 according to the invention shown includes a hydrophone 12 for sensing underwater the sonar pulses emitted by a transducer remotely located at the same water depth as, and at a measured distance away from, the hydrophone. One of the two terminals of hydrophone 12 is electrically connected with ground through a calibration resistor 13, as is normally done. The hydrophone utilized should have a substantially flat frequency response over the selected range since it is desirable that the meter be able to measure transducer source levels of a variety of sonar systems having a wide range of operating frequencies such as 1 to 30 kc. It is also desirable that the open circuit output voltage of the hydrophone vary linearly with increases in pressure to which the submerged hydrophone is subjected by the action of the transducer-projected sonar pulses. A satisfactory such hydrophone is the Model No. LC-32 manufactured by Atlantic Research.

The other terminal of hydrophone 12 is connected to the input terminal of a precision step attenuator 14 which can be selectively adjusted by a movable dial 16 which is associated with a scale calibrated to indicate directly the radiated power level of a remotely located sonar transducer in db referenced to 1 dyne/cm.$^2$ at one yard. The attenuator 14 is shown merely illustrative and a suitable such attenuator is the Davin linear step attenuator Model No. 6461-M the dial of which indicates a range of attenuation in 2 db steps from 150 db up to 90 db. The output of attenuator 14 is fed into an amplifier 18 which is preferably a linear amplifier since, at a given frequency, the desired hydrophone output varies linearly with the changing pressure intensity to which the hydrophone may be subjected by projected acoustical pulses of variable amplitude.

The output of amplifier 18 is fed sequentially through a calibration potentiometer 20 and a range attenuator 22 comprising a linear, ten-turn precision potentiometer to a second amplifier 24 which is also preferably linear. Since at a given depth the magnitude of the power level actually measured approximates a function which varies directly as the radiated power level at the source and inversely as the lateral spacing between the hydrophone 12 and the acoustic transducer, the range attenuator 22 is selectively adjustable to linearly attenuate its input by moving a figuratively illustrated range dial 26 associated with a scale which is so calibrated as to indicate the measured lateral spacing between the hydrophone 12 and the transducer within a selected range such as 10 to 1000 feet. The output of amplifier 24 is selectively fed either to one of the terminals T3, T4, T5, or T6 of a selector switch 30 through a corresponding one of a plurality of filters 28a, b, c and d of an optionally included filter bank 28 or to both terminals T2 and T7 of the switch 30 through an attenuator 31 artificially imparting that amount of loss which corresponds to the insertion loss of the filters in the bank 28. A movable wiper arm 32 of switch 30, shown in an OFF position contacting unconnected terminal T1, is electrically connected with a second calibration potentiometer 34 via a conductor 36.

Since the pulses transmitted by the transducer are not necessarily sinusoidal and since attenuators 14, 22, amplifiers 18 and 24 and potentiometer 20 are all preferably designed to linearly modify the amplitude of the output signal from hydrophone 12, it is desirable that the input received by the potentiometer 34 be essentially sinusoidal. In the event that the particular hydrophone 12 used has an undesirable degree of nonlinear frequency response, a suitable compensating circuit may be interposed in the circuit as in an input stage of the amplifier 24 in order to obtain from amplifier 24 an amplified output which substantially has a flat frequency response. The filters 28a, b, c and d are provided to eliminate from the output of the hydrophone any second or higher order harmonics of the accoustic pulse frequency which would cause distortion of the desired sinusoidal input to potentiometer 34.

Each of the filters 28a, b, c and d having the selected upper and lower limit frequencies noted in the drawing comprises a low pass filter which is preferably designed so that the upper limit frequency output thereof is only one decibel down from those for the frequencies well within the range and so that the second harmonic of the lower limit frequency is twenty decibels down from those frequencies within the range. Such filters may be designed in accordance with suggestions in Chapter 6 of Reference Data for Radio Engineers, International Telephone and Telegraph Corporation, 4th edition (1956). It is desirable that each of the filters 28a, b, c and d have the same insertion loss in order that only one scale for the dial 16 of source level attenuator 14 need be utilized. When the meter 10 is being used to measure source levels, the wiper arm 32 is positioned to contact a selected one of the terminals T3 to T6 to include in the circuit the filter having that range within which falls the operating frequency of the transducer being measured.

The wiper arm 32 is also electrically connected with an input terminal of a third linear amplifier 38 whose output is fed to an input terminal of a Schmitt trigger 40 which functions as a signal amplitude discriminating device by producing an output when a signal of a certain design amplitude is received. The output of the Schmitt trigger 40 is fed to an input terminal of a monostable multivibrator 42 having its output terminal connected with an indicating device such as a mechanical, visual annunciator 44 having an indicating flag of a selected color such as green. The multivibrator 42, upon activation by the Schmitt trigger 40, emits an annunciator activating pulse of sufficient width to obtain a visible reading from hydrophone-sensed pulses of short width.

A slidable contact 46 of the calibration potentiometer 34 is similarly electrically connected with an input terminal of a fourth linear amplifier 48 whose output is fed to an input terminal of a second Schmitt trigger 50 which also functions as a signal amplitude discriminating device. The output of the Schmitt trigger 50 is fed to an input terminal of a second monostable multivibrator 52 whose output is fed to a second visual annunciator 54 desirably having a different indicating color, such as red. Flag-type, visual annunciators are preferably used in the indicating circuits since it is difficult to ascertain whether or not small lamps are indicating in bright sunlight.

The gains of the amplifiers 38, 48 and the trigger levels of Schmitt triggers 40, 50 are precisely set to respond to respective predetermined input signal amplitude levels so that the position of dial 16 indicates in db referenced to one dyne/cm.$^2$ at one yard the radiated power level of the transducer being measured when annunciator 44 is indicating and annunciator 54 is not indicating. In a meter 10 including the hydrophone specifically described, it has been found convenient to so set the threshold response level of Schmitt trigger 40 that it produces an output to activate multivibrator 42 and, consequently, cause annunciator 44 to indicate when, simultaneously, dial 16 is indicating a source level of 120 db, dial 26 is indicating a lateral separation or range of 1000 feet and a hydrophone output of 25 millivolts is being received by attenuator 14. Similarly, the threshold response level of Schmitt trigger 50 is so set that it produces an output to ultimately cause annunciator 54 to indicate when, simultaneously, dial 16 is indicating a source level of 116 db, dial 26 is indicating the same range of 1000 feet, and a hydrophone output of the same voltage, 25 millivolts, is being received by attenuator 14. When there are two dial 16 positions, e.g. 118 db and 120 db, at which only annunciator 44 is indicating, the higher reading, 120 db, is to be read. The 120 db source level was selected in that for the hydrophone utilized, an output of 25 millivolts was calculated to be obtained when a sonar transducer located 1000 feet away is emitting sonar pulses having a radiated power level of 120 db. Since annunciator 54 is set to respond to sensed pulses of only slightly greater amplitude than is annunciator 44, one can quickly find that maximum setting of dial 16 for activating annunciator 44 without activating annunciator 54 so that the critical, calibrated attenuation of the hydrophone ouput is obtained to produce a signal from switch 30 having an amplitude between those required to trigger the Schmitt triggers 40 and 50. If only annunciator 44 were used, the lowest position, i.e. 122 db rather than 120 db, would be read from the scale associated with dial 16.

In order to ascertain whether or not the meter 10 is properly calibrated, the meter also includes an amplitude calibrated oscillator 56 which produces an output having a non-critical selected frequency such as 5 kc. within the range of flat frequency response of the hydrophone 12 and the selected precise amplitude such as 25 millivolts R.M.S. indicated above, which amplitude depends upon the sensitivity of the particular hydrophone 12 used in the meter 10. A suitable battery powered calibrated oscillator 56 may be fabricated from components well known in the art of electronics. For example, a pulse generator 58, which may comprise a relaxation type oscillator, is included therein which generator produces an output having pulses which are repeated at the selected frequency and are fed to trigger a flip-flop 60. The output of the flip-flop 60 has a precise amplitude controlled by diodes of the reference type, and is so filtered in an appropriately designed filter 62 that the filter output is sinusoidal and has the selected precise amplitude, 25 millivolts R.M.S. An emitter follower 64, whose function is to match impedances, receives the output of the filter 62 and passes same to a wiper arm 66 of a selector switch 68, the wiper arm 66 being preferably fixed for movement with the wiper arm 32 of switch 30 so that terminals T1, T2 and T7 of both switches positionally correspond. Terminal T2 of switch 68 is electrically connected via a conductor 70 with the terminal of hydrophone 12 which is electrically connected with ground through calibration resistor 13.

The amplifiers 18, 24, 38, 48, the Schmitt triggers 40, 50, the monostable multivibrators 42, 52 and the components of the calibrated oscillator 58 may all be fabricated from circuits well known in the art and are preferably transistorized in order to provide a compact, portable, battery-operated meter. A battery voltage used to power the above-mentioned meter components preferably is regulated by suitable, well known voltage regulation means which may include Zener diodes to assure that the components always receive a power input voltage of predetermined amplitude.

Given a suitable amplifier 18 responsive to low level signals, the positions of the source level attenuator 14 and the range attenuator 22 could be interchanged without deleteriously affecting meter accuracy.

After fabrication, the meter must be precisely calibrated. An A.C. voltmeter 80 and an adjustable audio oscillator 82 are removably connected substantially as indicated by the dotted lines in the drawing to a terminal TP-2 in conductor 70; the wiper arms 32 and 66 being moved to contact terminals T7 in order to bypass the filter bank 28 and in order to disconnect the calibrated oscillator 56 from the hydrophone 12. The amplitude of the output of the oscillator 82 is adjusted until a signal of a selected frequency such as 5 kc. and of the desired precise amplitude, such as 25 millivolts as indicated by the voltmeter 80, is being fed into the hydrophone 12. Dial 16 of attenuator 14 is positioned to indicate 120 db and the range dial 26 is set to indicate 1000 feet. Thereafter the calibration potentiometer 20 is adjusted to a position such that the annunciator 44 is just over the threshold of indication for the above-indicated dial 16 position. It may also be necessary to adjust the gain of the amplifiers 18, 24, 38. An oscilloscope 84 removably connected substantially as indicated by the dotted lines in the drawing with a terminal TP-1 in conductor 36 may be used to ascertain whether or not the waveform at that point is sinusoidal. Dial 16 is then moved to indicate 116 db, and calibration potentiometer 34 is adjusted until annunciator 54 is just over the threshold of indication for that setting. The frequency of output of audio oscillator 82 may be tuned to another frequency such as 3 kc., which is well within the range of flat frequency response of hydrophone 12, and the wiper arm 32 sequentially moved to each of the terminals T3, T4, T5 and T6 to ascertain for each arm position that only annunciator 44 is indicating when dial 16 is positioned to indicate 120 db. Also a voltmeter 86 and oscillator 88 may be connected in the manner indicated by the dotted lines to terminal TP-1 in order to precisely set the above-described trigger levels of the Schmitt triggers 40 and 50. Setting the trigger levels of the triggers 40 and 50 may be further facilitated by connecting an oscilloscope (not shown) to observe the waveform at the input of each Schmitt trigger. A notch will appear in the respective waveform when the corresponding trigger level is reached. The amplitude of the output of the calibrated oscillator 56 may be indicated by voltmeter 80 when wiper arm 66 of switch 68 is moved to contact terminal T2. The oscillator 82 of course should be disconnected.

Once the meter has been so calibrated, unskilled personnel may quickly and easily use it for measuring the radiated power levels of a ship's transducer. The hydrophone 12 is placed a measured distance from and at the same depth as the transducer to be monitored so that the hydrophone is aligned with the beam being transmitted. With the transducer not in operation, wiper arm 32 is moved to contact terminal T2 so that the operator may obtain the calibration test signal from calibration oscillator 56 in order to check to see whether the meter has been properly calibrated. In this mode the range dial 26 is positioned to indicate 1000 feet and the source level dial 16 is first positioned to indicate 120 db whereupon annunciator 44 should be indicating. Both annunciators 44, 54 should be indicating after the dial 16 has been repositioned to indicate 116 db.

In the measuring mode, the wiper arm 32 of switch 30 is selectively positioned to contact one of the terminals T3 to T6 to include that filter having a range within which falls the operating frequency of the transducer. The range dial 26 is positioned to indicate that measured separation between the hydrophone 12 and the transducer being monitored. With the transducer operating at a selected level such as full, the dial 16 is repositioned from a 150 db position to that position at which annunciator 44 is indicating, this position being the highest source level reading where annunciator 44 indicates and annunciator 54 does not indicate. The source or radiated power level may then be directly read from the dial of the attenuator 14.

From the foregoing description it is seen that there has been provided a portable, self-calibrating sonar source level meter which may be used by unskilled personnel to obtain power level of a remotely located underwater acoustic transducer.

It should be understood, of course, that the foregoing disclosure relates only to a preferred embodiment of the invention and that numerous modifications or alterations may be made without departing from the spirit and scope of the invention as set forth in the appended claims.

What is claimed is:

1. A meter for measuring and indicating the radiated power level of a signal emitting means comprising:
    signal sensing means positionable a selected measured distance from signal emitting means for sensing signals emitted thereby and producing a sensor output;
    attenuator means operatively connected to receive said sensor output and produce therefrom an attenuator output, said attenuator means including a first attenuator having an adjusting means and an associated dial calibrated in units of radiated power level and including a second attenuator for imposing in accordance with said measured distance a further level of attenuation of said sensor output; and
    threshold display means operatively connected to receive said attenuator means output for indicating when attenuator output has reached a predetermined level.

2. A meter according to claim 1 which further comprises:
    additional display means operatively connected to receive said attenuator output for indicating when the attenuator output has reached a level selectively greater than said predetermined level.

3. A meter for measuring and indicating the radiated power level of a signal emitting means comprising:
    signal sensing means positionable a selected measured distance from signal emitting means for sensing signals emitted thereby and producing a sensor output;
    attenuator means operatively connected to receive said sensor output and produce therefrom an attenuator output including first and second adjusting means and associated dials calibrated in units of radiated power level and units of distance respectively; and
    threshold display means operatively connected to receive said attenuator output for indicating when the attenuator output has reached a predetermined level.

4. A meter according to claim 3 which further comprises:
    calibration test signal producing means selectively connectable with said sensing means for providing a calibration signal having a predetermined amplitude to said sensing means.

5. A meter according to claim 4 wherein said calibration test signal means comprises:
    pulse generator means for producing a pulsating output;
    flip-flop means connected to receive said pulsating output for responsively producing a flip-flop output of predetermined amplitude; and
    filter means connected to receive said flip-flop output for producing therefrom a sinusoidally varying calibration signal having said predetermined amplitude.

6. A meter according to claim 3 wherein said threshold display means comprises:
    a Schmitt trigger including circuit means connected to receive said attenuator output for producing a trigger output in response to an attenuator output having a level at least equalling said predetermined level; and
    indicator means connected to receive said trigger output and responsive thereto for indicating the reception thereof.

7. A meter according to claim 6 wherein said threshold display means further comprises:
a Schmitt trigger including circuit means operatively connected to receive said attenuator output for producing a trigger output in response to an attenuator output having an amplitude at least equalling said predetermined level;
a monostable multivibrator operatively connected to produce an output in response to receiving said trigger output; and
indicator means connected to receive said multivibrator output and responsive thereto for indicating the reception thereof.

8. A meter according to claim 6 wherein said indicator means comprises:
a visual annunciator activated in response to reception of said output from said monostable multivibrator.

9. A meter according to claim 3 wherein said attenuator means further comprises:
low pass filter means operatively connected for producing an attenuator means output from which have been filtered the second and higher order harmonics of an operating frequency of said signal emitting means.

10. A meter according to claim 3 which further comprises:
additional display means operatively connected to receive said attenuator output for indicating when the attenuator output has reached a level selectively greater than said predetermined level.

11. A meter according to claim 10 which further comprises:
calibration test signal producing means selectively connectable with said sensing means for providing a calibration signal having a predetermined amplitude to said sensing means.

12. A meter according to claim 10 wherein the first and second said display means each comprise:
a Schmitt trigger including circuit means operatively connected to receive said attenuator output for producing a trigger output in response to an attenuator output having the corresponding said level; and
indicator means connected to receive said trigger output and responsive thereto for indicating the reception thereof.

13. A meter according to claim 10 wherein the first and second said display means each comprise:
a Schmitt trigger including circuit means operatively connected to receive said attenuator output for producing a trigger output in response to an attenuator output having the corresponding said level;
a monostable multivibrator operatively connected to produce an output in response to receiving said trigger output; and
indicator means connected to receive said multivibrator output and responsive thereto for indicating the reception thereof.

14. A meter according to claim 10 wherein said attenuator means further comprises:
amplifier means operatively connected to amplify an attenuated output from one of said first and second adjusting means for producing an amplified attenuator output.

15. A meter according to claim 10 wherein said attenuator means further comprises:
low pass filter means operatively connected for producing an attenuator means output from which have been filtered the second and higher order harmonics of an operating frequency of said signal emitting means.

16. A meter according to claim 15 wherein said attenuator means further comprises:
first amplifier means operatively connected to amplify the attenuated output from said first adjusting means, the amplified output thereof being attenuated in accordance with the adjustment of said second adjusting means; and
second amplifier means operatively connected to amplify the attenuated, amplified output from said second adjusting means, the output thereof being that signal which is filtered by said low pass filter means.

17. A meter according to claim 16 wherein said attenuator means further comprises:
circuit means including an attenuator having the same insertion loss as said low pass filter means, which circuit means are operatively connected to receive the output of said second amplifier means; and
switch means operatively connected to said filter means, said circuit means and said display means for selectively operatively connecting said display means alternatively with said filter means and with said circuit means.

References Cited

UNITED STATES PATENTS

| | | | |
|---|---|---|---|
| 2,706,285 | 4/1955 | Scott | 340—3 |
| 2,856,583 | 10/1958 | Allison | 181—0.5 X |
| 3,079,583 | 2/1963 | Beitscher et al. | 340—5 |
| 3,167,150 | 1/1965 | Darby et al. | 181—0.5 |

RICHARD A. FARLEY, *Primary Examiner.*